H. AUSUBEL.
HYPODERMIC SYRINGE CONTAINER.
APPLICATION FILED DEC. 30, 1919.

1,378,806.

Patented May 17, 1921.

INVENTOR
Herman Ausubel
BY
Benjamin Roman
ATTORNEY

UNITED STATES PATENT OFFICE.

HERMAN AUSUBEL, OF NEW YORK, N. Y.

HYPODERMIC-SYRINGE CONTAINER.

1,378,806. Specification of Letters Patent. Patented May 17, 1921.

Application filed December 30, 1919. Serial No. 348,275.

*To all whom it may concern:*

Be it known that I, HERMAN AUSUBEL, a citizen of the United States, and resident of the city of New York, in the county of Kings and State of New York, have invented a certain new and useful Hypodermic-Syringe Container, of which the following is a specification.

This invention relates to devices that are utilized in connection with dental or medical hypodermic syringes, for the convenient placing away of the syringe and to constantly maintain the needle of the syringe in aseptic state.

The principal object of my invention is to provide a simple, inexpensive, conveniently and economically manufacturable, conveniently utilizable, efficient, and improved medical hypodermic syringe container.

Another object of my invention is to provide a container which will completely inclose the medical hypodermic syringe and maintain every part thereof in aseptic condition.

A further object is to provide a container that will maintain the upper part of the syringe in aseptic state as well as the lower part thereof.

A still further object is to provide a container for the syringe, which will afford convenient means for inserting the sterilizing material thereinto.

Other objects and advantages will hereinafter appear.

In the accompanying drawings,—

Figure 1:
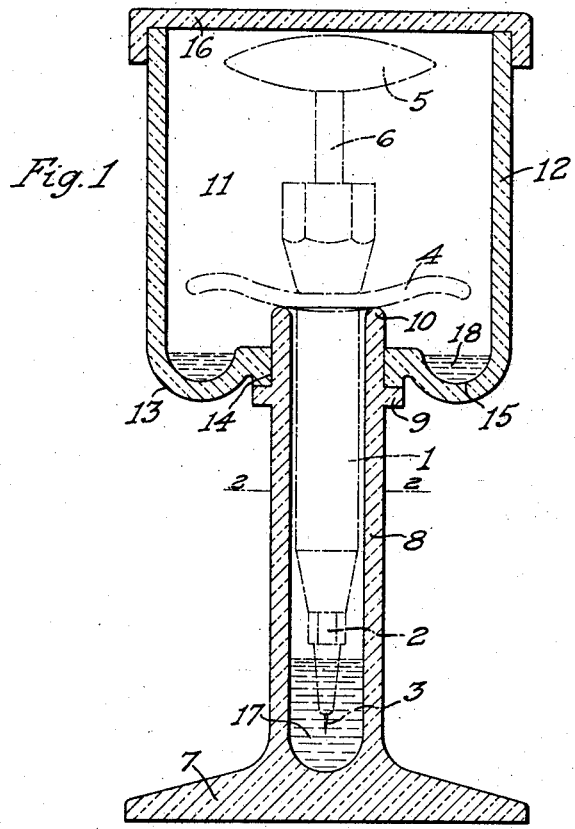
Figure 1 is a general cross-sectional elevation of the container, with the syringe shown diagramatically in dash and dot lines.
Figure 2:
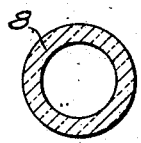
Fig. 2 shows a cross-sectional plan view of a portion of the container shown in Fig. 1.

The medical hypodermic syringe, as ordinarily constructed comprises a cylindrical body 1 to the lower end of which is secured a holder 2 for its hypodermic needle 3, and a transverse handle 4 is secured at the upper portion of the body 1. A knob 5 forms part of a rod 6 which acts as a plunger in coöperation with the cylindrical body 1. When operating the syringe it is taken hold of by its handle 4 with one hand, and with the other hand the knob 5 is grasped to reciprocate the rod 6.

The container is preferably made entirely of glass, and is provided with a base 7 from the central portion of which projects a tubular receptacle 8, that has a bead 9 formed near its upper extremity or rim 10 and its interior bottom portion is preferably rounded out in the configuration shown. At the upper part of the container is provided a casing or receptacle 11 that comprises an annular wall 12 and a floor portion 13 in the center of which is formed an opening 14 adapted to slip over the end portion of the tubular receptacle 8, whereby the receptacle 11 may be seated upon the ledge or bead 9 in the manner shown. In the floor 13 and adjacent the wall 12 is formed an annular channel 15 which is semicircular in cross-sectional configuration. A cover 16 fits over the upper rim of the receptacle 11 and thereby closes it effectively.

When utilizing the container, any suitable antiseptic fluid is poured into the bottom of the tubular receptacle 8 and a suitable solution or volatile antiseptic powder may be inserted into the channel 15 of the receptacle 11, and the latter receptacle is then placed over the receptacle 8 in the assembled state shown. The hypodermic syringe may be then placed away by merely inserting its cylindrical body 1 into the receptacle 8 with its needle 3 immersed into the fluid 17, and permitting its handle 4 to rest upon the rim 10 of said receptacle, whereupon the upper part of the syringe remains within the upper receptacle 11 which may be then closed with the cover 16 so as to entirely inclose the upper part of the syringe. It will be evident that when the hypodermic syringe is thus placed away in the container it remains completely inclosed and is thereby maintained in clean, dry, and sanitary condition, and incidentally the antiseptic fluids or powders 17, 18 vaporize and fill the interiors of the receptacles 8, 11, and the vapors coming in contact with every external portion of the syringe and acting as a germicide conduce further toward the maintenance of the syringe in perfect aseptic condition, so that it is at all times ready for immediate use without danger of contamination to the patient. The construction of the container in the separate parts 8, 11 is conducive toward convenient and thorough cleansing of its interior and for conveniently pouring the antiseptic fluid into the receptacle 8.

According to the modification shown in

Figure 3:
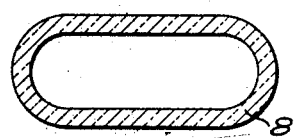
Fig. 3 shows a cross-sectional plan view of a modification of the container.

Fig. 3, the receptacle 8 may be made elongated in transverse-sectional configuration, whereby several syringes may be inserted therein and thus placed away within the container.

Variations may be resorted to within the scope of the invention.

Having thus described my invention, I claim:

1. A container for hypodermic syringes of the class described having the combination of a base, a tubular portion extending upwardly from said base and adapted to contain disinfecting material in the bottom thereof, the upper end of said tube adapted to hold the syringe whereby its cylinder is disposed within said tube with its needle immersed in the disinfecting material, said tube having a ledge, a casing surrounding the upper part of the syringe having a floor adapted to slip over the upper end of said tube and resting in place on said ledge, said floor having an annular groove adapted to contain disinfecting material, and a cover for closing said casing.

2. A container for hypodermic syringes of the class described having the combination of a receptacle, means to hold the syringe whereby its lower portion is disposed within said receptacle, a casing upon said receptacle adapted to surround the upper part of the syringe, said casing having means to hold disinfecting material, and a cover for closing said casing.

3. A container for hypodermic syringes of the class described having the combination of a receptacle, means to hold the syringe whereby its lower portion is disposed within said receptacle, a casing mounted upon said receptacle and removable therefrom adapted to surround the upper part of the syringe, and said casing having means to hold disinfecting material.

4. A container for hypodermic syringes of the class described having the combination of a base, a tubular portion extending upwardly therefrom, means to hold the syringe whereby its lower portion is disposed within said tubular portion, a casing mounted upon said receptacle and removable therefrom adapted to inclose the upper part of the syringe, said casing having means to hold disinfecting material, a cover for closing said casing, and said tubular portion being elongated in cross-sectional configuration to permit a plurality of syringes to be maintained within the container.

5. A container for hypodermic syringes of the class described having the combina- of a receptacle for the lower portion of the syringe, a receptacle for the upper portion of the syringe, and means in said latter receptacle to hold disinfecting material.

6. A container for hypodermic syringes of the class described having the combination of a base, a tubular portion extending upwardly therefrom, means to hold the syringe whereby its lower portion is disposed within said tubular portion, a casing mounted upon said receptacle and removable therefrom adapted to inclose the upper part of the syringe, and the opening of said tubular portion being elongated in cross-sectional configuration to permit a plurality of syringes to be maintained within the container.

Signed at the city of New York, in the county of New York, and State of New York, this 26th day of December, A. D. 1919.

HERMAN AUSUBEL.